V. H. KRIEGSHABER.
PIPE COUPLING.
APPLICATION FILED FEB. 12, 1908.
924,558.
Patented June 8, 1909.
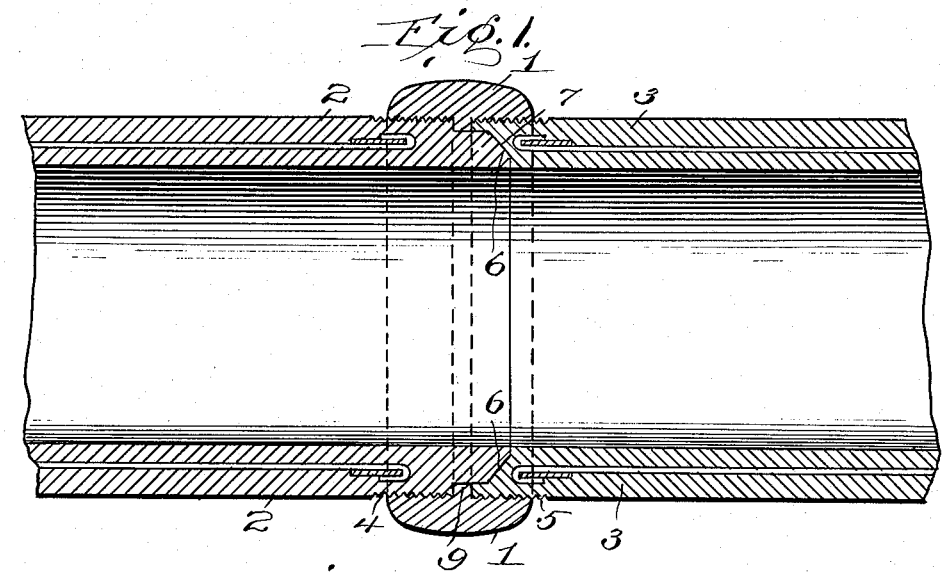
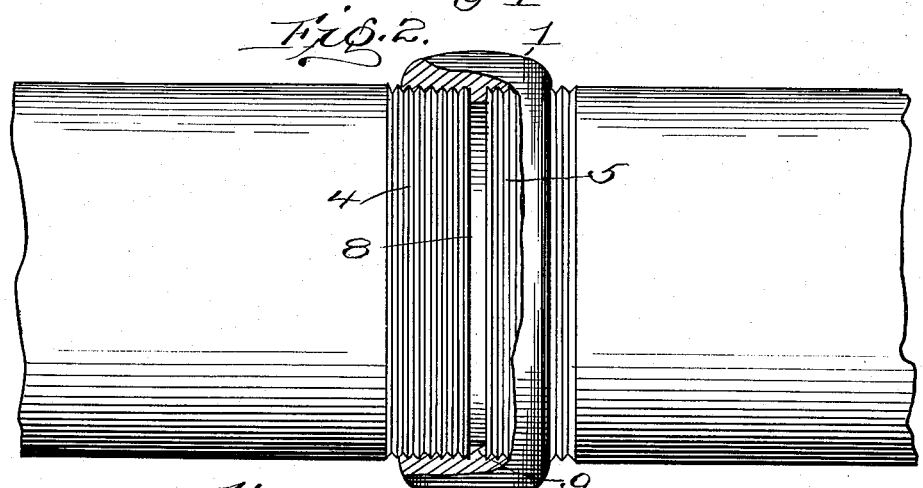
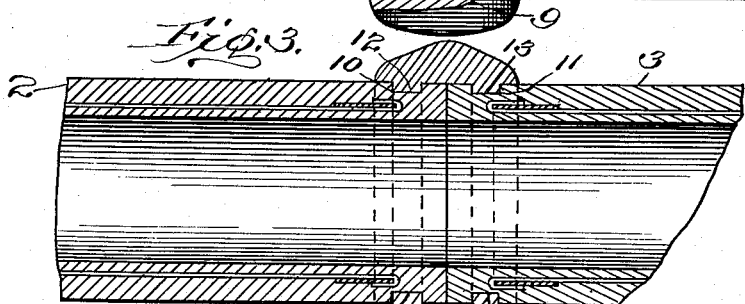
Witnesses
Inventor
Victor H. Kriegshaber
By Mason Fenwick & Lawrence,
his Attorneys

UNITED STATES PATENT OFFICE.

VICTOR H. KRIEGSHABER, OF ATLANTA, GEORGIA.

PIPE-COUPLING.

No. 924,558.  Specification of Letters Patent.  Patented June 8, 1909.

Application filed February 12, 1908. Serial No. 415,545.

*To all whom it may concern:*

Be it known that I, VICTOR H. KRIEGSHABER, a citizen of the United States, residing at Atlanta, in the county of Fulton and State of Georgia, have invented certain new and useful Improvements in Pipe-Couplers; and I do hereby declare the following to be a full, clear, and exact description of the invention, such as will enable others skilled in the art to which it appertains to make and use the same.

This invention relates to pipe couplers, and particularly to improved couplers designed to form an elastic joint, and has for an object the provision of an encircling composition arranged to firmly grip the ends of joining pipes.

Another object in view is the provision of a connecting substance for encircling the ends of abutting pipes and gripping the same formed of substantially imperishable matter.

Another object in view is the provision of a bitumen or asphalt mixture cast around the ends of abutting pipes for forming a tight joint and one that will be flexible for permitting the settling or changing slightly of the position of the pipe without opening a joint therebetween.
With these and other objects in view the invention comprises certain novel constructions, combination and arrangement of parts as will be hereinafter more fully described and claimed.
In the accompanying drawing: Figure 1 is a vertical section through the abutting ends of two pipes and a coupler formed according to the present invention. Fig. 2 is a plan view of Fig. 1 with certain parts broken away. Fig. 3 is a vertical longitudinal section through the abutting ends of two pipes and a slightly modified form of coupler shown in connection therewith.

In placing pipes in the ground as, for instance, conduit pipes, water pipes, and the like the same are usually placed in the ground and then have their ends secured together in various ways for forming a tight joint therebetween so that there will be no leakage. Various ways as, for instance, casting cement around the ends, have been used in pipes of a comparatively large size for forming a tight joint between the pipes for preventing any leakage at that point.
However, in case the ground should settle or there should be any movement of the ground from any cause the cement will break or crack and consequently permit leakage. To overcome any likelihood of breaking the joint I have provided a joining or coupler of yielding and somewhat flexible material designed to be molded in place around the abutting ends of pipes so as to form a tight joint and yet permit movement of the pipes without breaking or causing an opening to be formed.

In carrying out my invention I cast the material forming the coupling means around the abutting ends of pipes, as clearly shown in the drawing.

Referring to the drawing, 1 indicates the coupler placed in position for preventing any leakage from pipes 2 and 3 and for preventing any foreign matter to enter into pipes 2 and 3 through the abutting ends of the pipes. The coupling means 1 is formed of a yielding and flexible material as, for instance, bitumen or asphalt mixture in proper proportion with stone dust. In preparing the mixture the stone dust and the asphalt are mixed in proper proportion for forming a mass of spongy consistency and then when it is ready to form a coupler 1 a suitable mold of any desired kind is placed around the abutting ends of the pipes as 2 and 3 and the mixture formed is heated until the same is melted to a liquid consistency and is then poured into the mold around the abutting ends of the pipes. This will cause the mixture to come in contact with the unevenness in the ends of the pipe and thereby closely contact with or grip the ends of the pipes and prevent any matter from passing in through the ends of the pipes or from the ends of the pipes out. After the material has been placed in the mold, the mold is left in position until the material is cool. After the compound or mixture has cooled it hardens until it is of a somewhat spongy or springy consistency so that either pipe 2 or 3 may move slightly without injuring the coupler 1, or both the pipes may move by the settling of the earth or other cause and yet the joint be held tight by reason of the fact that the consistency of the mixture of which member 1 is formed will permit such movement and yet adhere to the ends of the pipes.

To positively hold the coupler 1 in position and also to assist in forming a tight joint between the pipes 2 and 3 and the coupler the pipes 2 and 3 are formed with ridges or angular corrugations 4 and 5 respectively.

In addition the pipe 2 is beveled off conical-shaped at 6 and is designed to fit into a seat 7 formed in pipe 3. The end of pipe 3 also falls short of pipe 2, as clearly seen in Fig. 1, so as to form a groove 8 into which a depending angular lug or ring 9 projects. When the liquid material has been poured into the mold the same will enter into groove 8 and also into the corrugations 4 and 5 and thereby tightly engage the pipes 2 and 3 and prevent any leakage at the joint. By the construction of the beveled portion 6 and seat 7, together with the groove 8 which is set back a short distance from the beveled portion and seat, a structure is provided in which a joint between the pipes 2 and 3, is, more strictly speaking, some distance from the joint sealed by coupler 1. This will prevent any of the matter of which coupler 1 is formed from passing through a joint into the pipe.

In Fig. 3 will be seen a slightly modified form of coupler in which grooves 10 and 11 are formed in pipes 2 and 3 respectively into which depending ridges 12 and 13 project. Grooves 10 and 11 and consequently depending ridges 12 and 13 preferably extend entirely around the pipes but if desired the same may fall short thereof and be only segmental in formation. This will form recessed portions in the pipes and lugs or hook portions in the coupler 1' for more firmly holding the coupler in position on the pipe, though ordinarily the grooves 10 and 11 are preferable. Pipes 2 and 3 may be made from concrete and properly reinforced as desired, or the same may be made from terra cotta or any other material and be formed with grooves 10 and 11 or groove 8.

The material being stone and asphalt gives a compound that is almost indestructible from the attacks of nature and will remain in place and form a tight coupler around the abutting ends of the pipes until removed therefrom.

What I claim is:

1. A pipe coupling joint comprising the adjacent ends of a pair of pipes, and a coupling member consisting of a ring or collar formed of a mixture of asphalt and pulverized stone molded about the adjacent ends of said pipes and flexibly connecting them together.

2. A pipe coupling joint comprising abutting ends of a pair of pipes, each end being provided with a circumferential groove and one end being formed with a projecting beveled portion and the other with a conical-shaped recessed portion in which said beveled portion fits, and a coupling member consisting of a collar or ring formed of an elastic water proof composition of matter surrounding the adjacent ends of said pipes and filling the grooves therein and thereby holding them together.

3. A pipe coupling joint comprising abutting ends of a pair of pipes having one end projecting into the adjacent end with a circumferential groove between said ends and a coupling member consisting of an elastic water proof plastic composition molded over and surrounding the adjacent ends of said pipes and forming a flexible connection between them.

4. A pipe coupling joint comprising abutting ends of a pair of pipes having the end of one pipe project into the end of the other pipe and formed with a groove at the juncture of the abutting ends, and a coupling member comprising elastic composition molded over and surrounding the abutting ends of said pipes and forming a flexible connection.

5. A pipe coupling joint comprising the adjacent ends of a pair of pipes having the end of one pipe project into the end of the other, and a coupling member spanning the abutting ends of said pipes comprising a ring of mixture of asphalt and pulverized stone molded around the adjacent ends of said pipes, said coupling member being formed with a depending annular flange projecting into the joint between the ends of said pipes.

In testimony whereof I affix my signature in presence of two witnesses.

VICTOR H. KRIEGSHABER.

Witnesses:
W. V. KRIEGSHABER,
O. E. STEWART.